March 26, 1940.  G. L. DAVIES  2,194,741
METHOD OF CONTROL OF RADIO GLIDE PATH
Filed Dec. 18, 1935
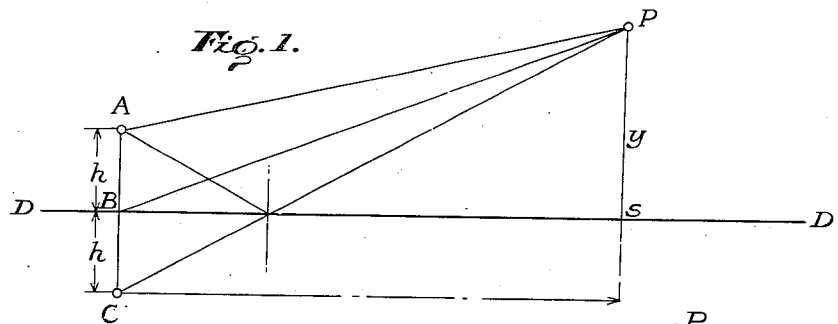
Fig. 1.
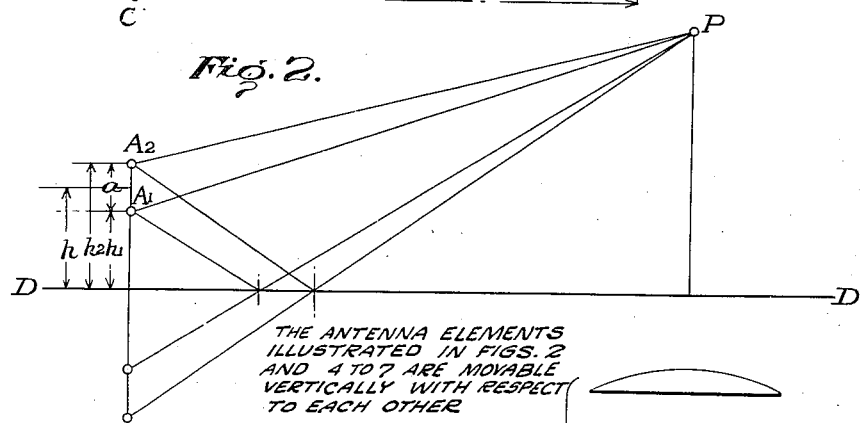
Fig. 2.
THE ANTENNA ELEMENTS ILLUSTRATED IN FIGS. 2 AND 4 TO 7 ARE MOVABLE VERTICALLY WITH RESPECT TO EACH OTHER
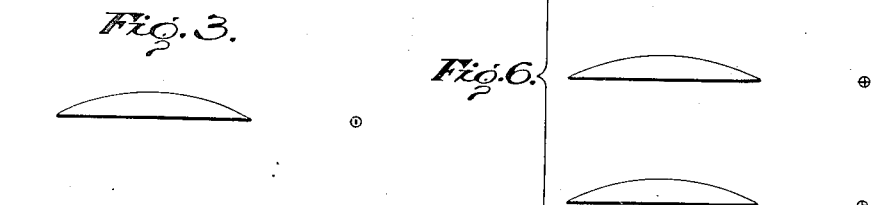
Fig. 3.
Fig. 4.
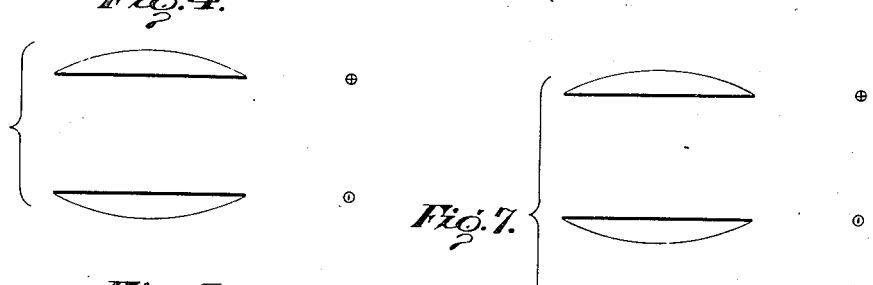
Fig. 6.
Fig. 5.
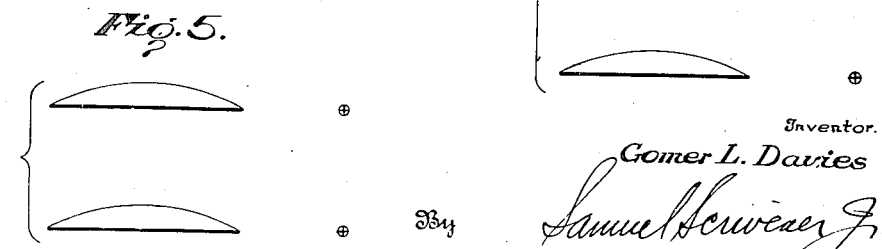
Fig. 7.
Inventor.
Gomer L. Davies
By Samuel Scrivener Jr.
Attorney Patented Mar. 26, 1940

2,194,741

UNITED STATES PATENT OFFICE 2,194,741

METHOD OF CONTROL OF RADIO GLIDE PATH

Gomer L. Davies, Cleveland, Ohio, assignor to Washington Institute of Technology, Inc., Washington, D. C., a corporation of Delaware Application December 18, 1935, Serial No. 55,128

8 Claims. (Cl. 250—11)

This invention relates to methods and apparatus for controlling and adjusting the position and shape of a line of constant field intensity which defines a radio path to ground from a point in space.

It has heretofore been proposed to provide a radio path to ground from points in space by transmitting at radio frequency from a horizontal antenna array arranged relatively close to the ground. The field at any point in space due to such radiation will be the resultant of direct radiations from the transmitting antenna array and radiations from the antenna array which have been reflected from the ground. The difference between the distances travelled by the reflected and direct radiations causes a phase difference between the two radiations at the receiver. The total field at the receiver is a function of this phase difference and if the transmitting conditions and power are maintained constant this function will be constant along a nearly parabolic path from the receiver to ground at the point of reflection of the reflected waves. This line of constant field intensity has been employed as a radio path to ground for aircraft during periods of fog or low visibility, or may be employed for purposes of airport traffic control during all types of weather.

Until the present invention, no means or methods have been known for controlling in any way the shape of a line of constant field intensity in space except that disclosed in my copending application Serial No. 55,129 and it has been the practise in establishing the so-called "beams" of this type to design the transmitting means with only the thought of sufficient field strength, giving no consideration to questions of shape of the path. While it is true that the position of the path, with respect to its vertical height above ground, may be varied by variation of the power input to the transmitting antenna, such a method of changing the path position has no effect on the path shape. Consequently, no practical means or methods have heretofore been known for varying the shape of a line of constant field intensity in space although the need for such means and methods has been apparent.

It is accordingly an object of this invention to provide methods and apparatus for controlling the position and shape of a line of constant field intensity in space which results from the radiations from an antenna situated close to the ground. It is proposed to achieve this object by suitable adjustment, arrangement and positioning of the transmitting antenna array, which arrangement and positioning has not heretofore been known.

Referring to the drawing:

Fig. 1 shows diagrammatically the various pertinent radiations from a single antenna, Fig. 2 shows diagrammatically the radiation fields of two vertically spaced antennas, and Figs. 3 to 7, inclusive, disclose various types of antennas to which the methods according to the invention may be applied.

If a single, horizontal antenna, such as antenna A in Figs. 1 and 3 or any number of such antennas placed end to end, be arranged over a plane reflecting surface DD and excited by current at radio frequency, the resulting field at any receiver in space, such as P, will be that due to direct radiations from antenna A along the line AP, and those due to radiations from antenna A reflected from the ground at O and traveling along the lines AOP. If the antenna is disposed at a height $h$ above ground, the receiver at a height $y$ above ground, and the antenna and receiver separated by a horizontal distance $x$, then $$AP = \sqrt{x^2 + (y-h)^2} = x \text{ within } 2\% \text{ if } \frac{y-h}{x} \leq 0.2$$

$$CP = \sqrt{x^2 + (y+h)^2} = x \text{ within } 2\% \text{ if } \frac{y+h}{x} \leq 0.2$$

Thus, the distances AP and CP may be considered as equal to $x$ insofar as amplitudes are concerned, provided $$\frac{y+h}{x} \leq 0.2.$$

The difference between AP and CP determines the relative phases of the direct and reflected waves, and under the above limitation regarding $$\frac{y+h}{x}$$

this path difference may be determined as follows:

$$AP = \sqrt{x^2 + (y-h)^2} = x\sqrt{1 + \frac{(y-h)^2}{x^2}} =$$

$$x\left[1 + \frac{(y-h)^2}{2x^2}\right] \quad (1)$$

$$CP = \sqrt{x^2 + (y+h)^2} = x\sqrt{1 + \frac{(y+h)^2}{x^2}} =$$

$$x\left[1 + \frac{(y+h)^2}{2x^2}\right] \quad (2)$$

$$CP - AP = x\left[1 \times \frac{(y+h)^2}{2x^2} - 1 - \frac{(y-h)^2}{2x^2}\right] =$$

$$x\left[\frac{y^2 + 2hy + h^2 - y^2 + 2hy - h^2}{2x^2}\right] = \frac{2hy}{x} \quad (3)$$

The phase difference $\phi$ between the reflected and direct radiations, due to the path difference CP—AP is given by the equation $$\phi = \frac{4\pi hy}{\lambda x} \quad (4)$$

If the reflection co-efficient is $K = M + jN$, and the field due to the antenna in free space at a distance $x$ from the antenna is $$E_0 = \frac{AI}{x}$$

where $A$ is a constant, and $I$ is the antenna current, then the field intensity at P is $$E = E_0 + E_0(M+jN)(\cos \phi - j \sin \phi) =$$
$$E_0[1 + M \cos \phi + N \sin \phi + j(N \cos \phi - M \sin \phi)] \quad (5)$$

In this expression the phase of the direct radiation along line AP has been taken as a reference. The expression may be obtained in other forms by taking different reference phases. Thus, if the reference phase is that of the reflected ray without the phase shift due to reflection, $$E = E_0(\cos \phi + j \sin \phi) + E_0(M+jN) =$$
$$E_0[M + \cos \phi + j(N + \sin \phi)] \quad (6)$$

If a reference phase midway between the above two is taken, then $$E = E_0\left(\cos \frac{\phi}{2} + j \sin \frac{\phi}{2}\right) + E_0(M+jN)\left(\cos \frac{\phi}{2} - j \sin \frac{\phi}{2}\right) = E_0\left[(1+M) \cos \frac{\phi}{2} + N \sin \frac{\phi}{2} + j\left\{N \cos \frac{\phi}{2} + (1-M) \sin \frac{\phi}{2}\right\}\right] \quad (7)$$

All three of these forms are equivalent and may be used interchangeably. In general the field intensity E may be denoted by the equation $$E = E_0(P + jQ) \quad (8)$$

or, since we are concerned with magnitude only, $$E = E_0 \sqrt{P^2 + Q^2} = E_0 \sqrt{1 + M^2 + N^2 + 2M \cos \phi + 2N \sin \phi} \quad (9)$$

The value of E for a perfectly reflecting ground is readily obtained from Equation 7 by substituting $M=-1$, $N=0$, whence, neglecting phase $$E = 2E_0 \sin \frac{\phi}{2} = 2E_0 \sin \left(\frac{2\pi hy}{\lambda x}\right) = \frac{2AI}{x} \sin \left(\frac{2\pi hy}{\lambda x}\right) \quad (10)$$

from which, if $\phi$ is small enough that $$\sin \frac{\phi}{2} = \frac{\phi}{2}$$

$$E = \frac{4\pi A I h y}{\lambda x^2} = \frac{4\pi A I y}{x^2} \cdot \frac{h}{\lambda} \quad (11)$$

or $$x^2 = \frac{4\pi A I h y}{\lambda E} \quad (12)$$

which is the familiar equation for the parabolic path obtained over a perfectly reflecting surface.

Equation 10 defines the field intensity at a point P in space resulting from the direct and reflected radiations from a single horizontal antenna arranged close to the ground. As shown by Equation 12 this field intensity is constant along a parabolic line having its origin at the point of reflection on the ground and passing through the receiver P, and this line of constant field intensity may be employed as a radio path to ground. Until the present invention and that disclosed in my co-pending application Serial No. 55,129, no means were known for controlling the shape of such a line of constant field intensity, although its position could be adjusted within a limited range by varying the transmitter power. According to the present invention I propose to adjust the height of the path above ground by adjustment of the height of the antenna A above ground. I have found that an increase in the height of the antenna above ground results in a lowering of the path, while if the antenna is lowered, the height of the path above ground is increased. By this method I propose to adjust the height above ground of the line of constant field intensity resulting from the direct and reflected raditions from a single horizontal antenna arranged relatively close to the ground in order to adapt this line to particular conditions which may be encountered. After adjustment of the height of the path by the means set forth above, further accurate adjustment may be made by varying the transmitter power. In the present state of the art no variation of the shape of a line of constant field intensity resulting from the direct and reflected radiations from a single horizontal antenna appears to be possible by means of adjustment of the height of the antenna above ground.

Other antenna arrays may be employed for establishing the line of constant field intensity in space, and a second type of array is disclosed in Fig. 2 in which two vertically spaced, horizontal antennas or series of end-to-end antennas are arranged so that the lower antenna array $A_1$ is disposed a distance $h_1$ above ground, while the upper antenna $A_2$ is arranged a distance $a$ above antenna $A_2$ and a distance $h_2$ above ground. If these two antenna members are so excited that the phase of the current in antenna $A_1$ leads that of antenna $A_2$ by $B°$, the field due to antenna $A_1$ at any point in space, such as $P_1$ is $$E_1 = E_0(P_1 + jQ_1) \quad (13)$$

while that due to antenna $A_2$ is $$E_2 = (P_2 + jQ_2)(\cos B + j \sin B) \quad (14)$$

The total field E is $$E = E_1 + E_2 = E_0[P_1 + jQ_1 + P_2 \cos B - Q_2 \sin B + j(Q_2 \cos B + P_2 \sin B)]$$
$$= E_0[P_1 + P_2 \cos B - Q_2 \sin B + j(Q_1 + Q_2 \cos B + P_2 \sin B)] \quad (15)$$

This equation may also be obtained in two other forms by shifting the reference phase, which forms are $$E = E_0[P_2 + P_1 \cos B + Q_1 \sin B + j(Q_2 + Q_1 \cos B - P_1 \sin B)] \quad (16)$$

$$E = E_0\left\{(P_1 + P_2) \cos \frac{B}{2} + (Q_1 - Q_2) \sin \frac{B}{2} + j\left[(Q_1 + Q_2) \cos \frac{B}{2} - (P_1 - P_2) \sin \frac{B}{2}\right]\right\} \quad (17)$$

It must be noted here that the quantities $M_1$, $N_1$ and $\phi_1$ involved in $P_1$ and $Q_1$ are different in general from the corresponding quantities $M_2$, $N_2$ and $\phi_2$ involved in $P_2$ and $Q_2$.

In order to effectively interpret Equations 16 and 17 it is necessary to assume a perfectly reflecting ground surface. Using Equation 7 for values of P and Q $$P_1 = P_2 = 0; \quad Q_1 = 2 \sin \frac{\phi_1}{2}; \quad Q_2 = 2 \sin \frac{\phi_2}{2}$$

Then $$E = 2E_0\left[\left(\sin \frac{\phi_1}{2} - \sin \frac{\phi_2}{2}\right) \sin \frac{B}{2} + j\left(\sin \frac{\phi_1}{2} + \sin \frac{\phi_2}{2}\right) \cos \frac{B}{2}\right] \quad (18)$$

If it is now assumed that $B = 180°$ $$E = 2E_0\left(\sin \frac{\phi_1}{2} - \sin \frac{\phi_2}{2}\right) = 4E_0 \cos \frac{1}{4}(\phi_1 + \phi_2) \sin \frac{1}{4}(\phi_1 - \phi_2) \quad (19)$$

Since phase (and hence sign) is immaterial, this may be written $$E = 4E_0 \sin \tfrac{1}{4}(\phi_2 - \phi_1) \cos \tfrac{1}{4}(\phi_2 + \phi_1) \qquad (20)$$

Substituting the values $$\phi_1 = \frac{4\pi h_1 y}{\lambda x}; \quad \phi_2 = \frac{4\pi h_2 y}{\lambda x}; \quad \frac{h_2 + h_1}{2} = h; \quad h_2 - h_1 = a$$

and $$\tfrac{1}{4}(\phi_2 + \phi_1) = \frac{\pi y}{\lambda x}(h_2 + h_1) = \frac{2\pi y h}{\lambda x}$$

$$\tfrac{1}{4}(\phi_2 - \phi_1) = \frac{\pi y}{\lambda x}(h_2 - h_1) = \frac{\pi a y}{\lambda x}$$

we obtain $$E = 4E_0 \sin \frac{\pi a y}{\lambda x} \cos \frac{2\pi h y}{\lambda x} \qquad (21)$$

which is the expression for the field intensity at a point P in space, due to the direct and reflected radiations from two vertically spaced horizontal antennas energized by currents having a phase displacement of 180°, such as is disclosed in Fig. 4. I have found that the shape of the line of constant field intensity defined by this equation may be varied by varying the height of the antenna array above ground. In effecting control by this means, the two spaced antennas are moved as a unit with respect to the ground and the value of term $h$, $h_1$ and $h_2$ are varied equally, the value of term $a$ remaining constant. Thus, if it is desired to make the line of constant field intensity flatter, i. e., more nearly parallel to the ground, this may be effected by lowering the entire antenna array, while if it is desired to make the path steeper, this may be effected by raising the array. I have also found that the height of the path above ground may be varied by varying the spacing between the antennas, i. e., by varying the value of the term $a$. I have found that the height above ground of the line of constant field intensity may be lowered by increasing the spacing between the antennas, while the height of the path may be increased by decreasing the spacing between the antennas. By employing either of these two means or both of them in combination it is possible to control the shape and height of the path, whereby it may be made either steeper or flatter, and the height of the path above ground may be increased or decreased.

If the two antennas $A_1$ and $A_2$ are excited by currents which are in phase, such as those of Fig. 5, it may be shown that the field intensity at any point P in space due to the direct and reflected radiations from the antennas so energized will be $$E = 4E_0 \sin \frac{2\pi h y}{\lambda x} \cos \frac{\pi a y}{\lambda x} \qquad (22)$$

In this case I have found that the shape of the line of constant field intensity may be varied by varying the spacing between the antennas, i. e., changing the value of the term $a$. I have found that the line of constant field intensity may be made flatter by decreasing the spacing between the antennas, while if it is desired to make the path steeper, this may be effected by increasing the spacing between the antennas. If it is desired to adjust the height of the path above ground, this may be done by adjusting the height of the entire antenna system above ground, and I have found that if the height of the entire antenna system above ground is increased, the height of the path above ground will be decreased, while if the height of the entire antenna system above ground is decreased, the height of the path above ground will be increased.

If three vertically spaced, horizontal antennas, such as illustrated in Fig. 6 are employed, all three antennas being energized by currents which are in phase, it may be shown that the total field intensity at any point in space due to the direct and reflected radiations from this array will be $$E = 2E_0 \sin \frac{2\pi h y}{\lambda x}\left[\cos \frac{\pi a y}{\lambda x} + 1\right] \qquad (23)$$

If the center antenna is 180° out of phase with respect to the top and bottom antennas, as in Fig. 7, the total field at any point P in space due to the direct and reflected radiations from this array will be $$E = 2E_0 \sin \frac{2\pi h y}{\lambda x}\left[2\cos \frac{\pi a y}{\lambda x} - 1\right] \qquad (24)$$

In Equations 23 and 24, $a$ is the distance between top and bottom antennas, and $h$ is the height above ground of the center antenna, which is assumed to be equidistant from the top and bottom antennas.

In both cases of the three-element arrays the shape of the line of constant field intensity may be varied by varying the spacing between the top and bottom antennas, while the height above ground of the line of constant field intensity may be varied by varying the height of the entire antenna system above ground. I have found that if it is desired to make the shape of the line of constant field intensity flatter, this may be done by decreasing the spacing between the top and bottom antennas, while if it is desired to make the path steeper, this may be done by increasing the spacing between the top and bottom antennas. If it is desired to increase the height above ground of the line of constant field intensity, this may be done by decreasing the height of the entire antenna system above ground, while the height above ground of the line of constant field intensity may be lowered by increasing the height of the entire antenna system above ground. In all cases, final small adjustment of path position may be made by adjustment of transmitter power.

It will be apparent to those skilled in the art that by means of the methods and apparatus according to the present invention the field of usefulness of systems employing a line of constant field intensity as a path to ground for aircraft will be greatly enlarged, due to the fact that the path may be adjusted or varied in shape or height in order to adjust the path exactly to conditions obtaining at any particular landing field, which adjustment has heretofore been practically impossible of attainment.

While I have illustrated and described the invention in connection with arrays of horizontal antennas, in each case vertical elements may be substituted for the horizontal elements without departing in any way from the scope or applicability of the invention. The mathematical expressions given would be changed, in the case of the use of vertical antenna arrays, only by the addition of a factor in each case which accounts for the directivity of a single vertical element. This factor does not change the conclusions in any way. Accordingly, while the drawing and description illustrate and refer to horizontal antenna arrays, it is to be particularly understood that an array of vertical antennas arranged end-to-end may be substituted for like arrays of horizontal antennas in each case of the invention.

For example, if it were desired to employ vertical antennas in place of the three horizontal antennas of Fig. 7, it would be necessary only to substitute three vertical antennas, arranged end-to-end, for the horizontal array disclosed. These vertical antennas would then be energized in the same manner as the horizontal antennas of Fig. 7, i. e., the upper and lower vertical antennas would be energized by in-phase currents, while the center vertical antenna would be energized by current displaced 180° in phase from the in-phase currents supplied to the upper and lower antennas.

Other modifications and improvements are included within the scope of the invention, for the limits of which reference must be had to the appended claims.

I claim:

1. The method of varying the shape of a line of constant field intensity established between a point in space and the ground by the direct and ground-reflected radiations from an antenna array comprising a plurality of vertically-spaced radiating elements, which consists in varying the vertical spacing between the radiating elements of the antenna array.

2. The method of varying the shape of a line of constant field intensity established between a point in space and the ground by the direct and ground-reflected radiations from an antenna array comprising three vertically-spaced radiating elements, which consists in varying the vertical spacing between the top and bottom radiating elements.

3. The method of varying the shape of a line of constant field intensity established between a point in space and ground by the direct and ground-reflected radiations from an antenna array comprising two vertically-spaced radiating elements energized by in-phase currents, which consists in varying the vertical spacing between the radiating elements.

4. The method of varying the shape of a line of constant field intensity established between a point in space and the ground by the direct and ground-reflected radiations from an antenna array comprising three vertically-spaced radiating elements, the top and bottom elements of the array being energized by in-phase currents and the middle element being energized by a current which is displaced 180° in phase from the currents in the top and bottom elements, which consists in varying the vertical spacing between the top and bottom radiating elements.

5. The method of varying the shape of a line of constant field intensity established between a point in space and ground by the direct and ground-reflected radiations from an antenna array which is arranged above the ground surface and which comprises three vertically-spaced radiating elements energized by in-phase currents, which consists in varying the vertical spacing between the top and bottom elements.

6. The method of varying the height above ground of a line of constant field intensity established between a point in space and the ground by the direct and ground-reflected radiations from an antenna array comprising two vertically-spaced radiating elements one of which is energized by currents displaced 180° in phase from the currents energizing the other, which consists in varying the vertical spacing between the radiating elements.

7. The method of lowering the height above ground of a line of constant field intensity established between a point in space and the ground by the direct and ground-reflected radiations from an antenna array comprising two vertically-spaced radiating elements one of which is energized by currents displaced 180° in phase from the currents energizing the other element, which consists in increasing the vertical spacing between the radiating elements.

8. The method of increasing the height above ground of a line of constant field intensity established between a point in space and the ground by the direct and ground-reflected radiations from an antenna array comprising two vertically-spaced radiating elements one of which is energized by currents displaced 180° in phase from the currents energizing the other element, which consists in decreasing the vertical spacing between the radiating elements.

GOMER L. DAVIES.